US009629162B2

(12) United States Patent
Nagata et al.

(10) Patent No.: US 9,629,162 B2
(45) Date of Patent: Apr. 18, 2017

(54) RADIO BASE STATION, USER TERMINAL AND RADIO COMMUNICATION METHOD

(71) Applicant: NTT DOCOMO, INC., Tokyo (JP)

(72) Inventors: Satoshi Nagata, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 67 days.

(21) Appl. No.: 14/649,933

(22) PCT Filed: Oct. 23, 2013

(86) PCT No.: PCT/JP2013/078657
§ 371 (c)(1),
(2) Date: Jun. 5, 2015

(87) PCT Pub. No.: WO2014/091825
PCT Pub. Date: Jun. 19, 2014

(65) Prior Publication Data
US 2015/0319761 A1 Nov. 5, 2015

(30) Foreign Application Priority Data
Dec. 10, 2012 (JP) .................................. 2012-269276

(51) Int. Cl.
*H04W 72/04* (2009.01)
*H04W 74/00* (2009.01)
(Continued)

(52) U.S. Cl.
CPC ....... *H04W 72/0453* (2013.01); *H04L 5/0044* (2013.01); *H04L 5/0064* (2013.01);
(Continued)

(58) Field of Classification Search
CPC ........... H04W 72/0453; H04W 72/048; H04W 74/006; H04W 76/046
(Continued)

(56) References Cited

U.S. PATENT DOCUMENTS

2002/0136187 A1* 9/2002 Aoyama ............... H04W 16/28
370/342
2011/0103243 A1 5/2011 Larsson et al.
(Continued)

FOREIGN PATENT DOCUMENTS

EP 2747502 A1 6/2014

OTHER PUBLICATIONS

International Search Report issued in PCT/JP2013/078657 mailed on Jan. 21, 2014 (1 page).
(Continued)

*Primary Examiner* — Ronald B Abelson
(74) *Attorney, Agent, or Firm* — Osha Liang LLP

(57) ABSTRACT

The present invention is designed to allow effective use of frequency resources even when a plurality of user terminals of varying capabilities coexist. A radio base station, which communicates with a user terminal by using a plurality of component carriers, has a configuration section that configures a subframe of a first carrier type, which a plurality of user terminals of varying capabilities each can receive, and a subframe of a second carrier type, which part of the plurality of user terminals can receive, in component carriers, and a transmission section that transmits downlink signals to the user terminal by using the first carrier type and the second carrier type, and the configuration section configures the subframe of the first carrier type and the subframe of the second carrier type, on a dynamically changing basis, in at least one of the plurality of component carriers.

7 Claims, 12 Drawing Sheets

(51) Int. Cl.
*H04W 76/04* (2009.01)
*H04L 5/00* (2006.01)

(52) U.S. Cl.
CPC ....... *H04W 72/048* (2013.01); *H04W 74/006* (2013.01); *H04W 76/046* (2013.01); *H04L 5/001* (2013.01); *H04L 5/0048* (2013.01); *H04L 5/0073* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2012/0093107 | A1* | 4/2012 | Jeong | H04W 72/1215 370/329 |
| 2013/0003672 | A1* | 1/2013 | Dinan | H04L 1/00 370/329 |

OTHER PUBLICATIONS

NTT DOCOMO; "On the need for additional carrier types in Rel-11 CA"; 3GPP TSG RAN WG1 Meeting #66, R1-112428; Athens, Greece; Aug. 22-26, 2011 (4 pages).

Renesas Mobile Europe Ltd.; "Discussion on Enhancements for Dynamic TDD UL-DL Configuration"; 3GPP TSG-RAN WG1 Meeting #69, R1-122363; Prague, Czech Republic; May 21-25, 2012 (4 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

Extended Search Report issued in corresponding European Application No. 13861947.3, mailed May 23, 2016 (9 pages).

Panasonic; "Component carrier operation without PDCCH"; 3GPP TSG-RAN WG1 Meeting #58, R1-093598 (R1-093466); Shenzhen, China; Aug. 24-28, 2012 (4 pages).

\* cited by examiner

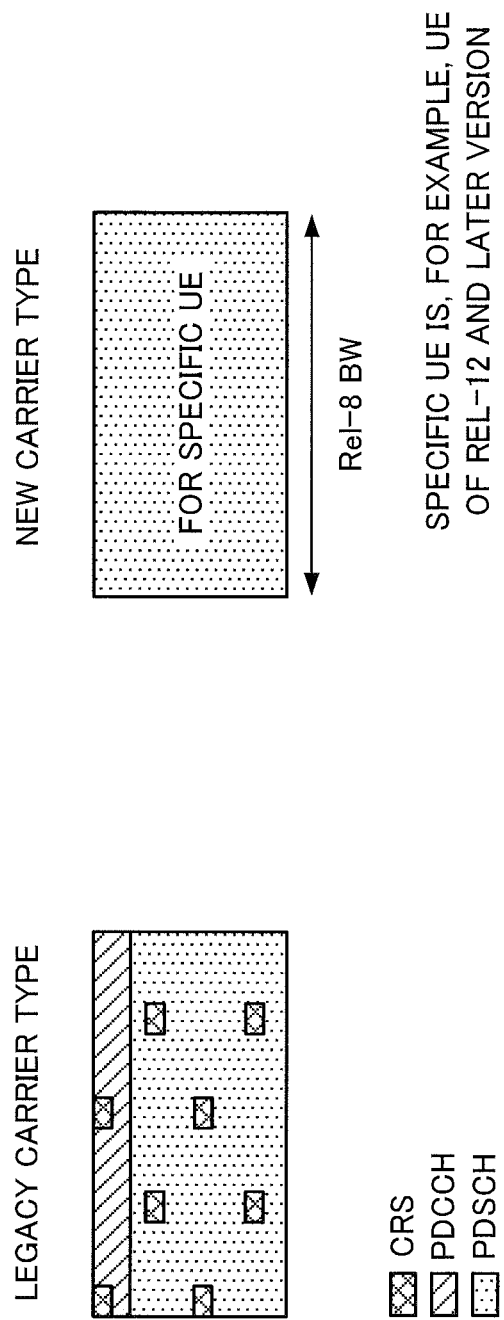

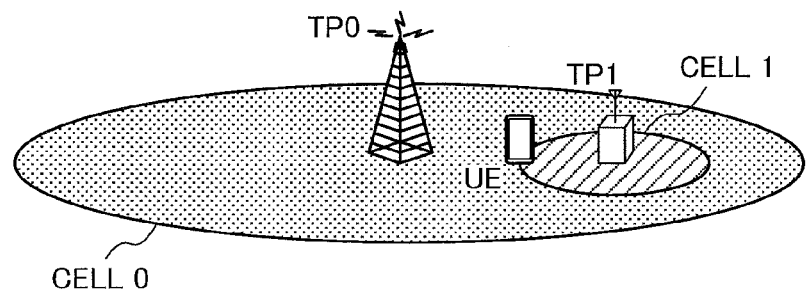
FIG.6A
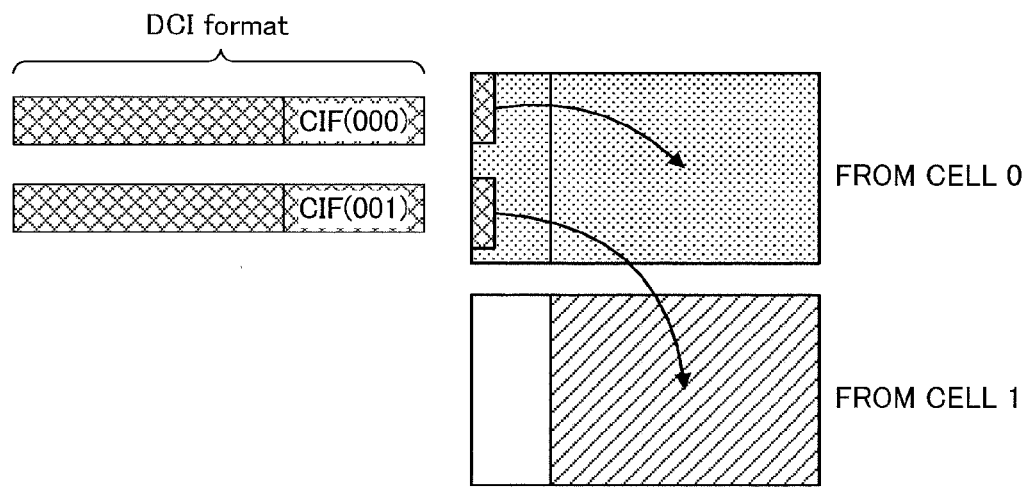
FIG.6B
| CIF BITS | CELL INDEX TO BE SCHEDULED |
|---|---|
| 000 | CELL 0 |
| 001 | CELL 1 |
FIG.6C

| CIF | | RRC CONFIGURATION |
|---|---|---|
| | CC INDICATOR | |
| 000 | CC0 | CC0 IS LEGACY CARRIER, AND CELL INDEX (CC0) |
| 001 | CC1 | CC1 IS NEW CARRIER TYPE, AND CELL INDEX (CC1) |
| 010 | CC2 | CC2 IS NEW CARRIER TYPE, AND CELL INDEX (CC2) |
| 011 | CC3 | CC3 IS NEW CARRIER TYPE, AND CELL INDEX (CC3) |
| 100 | CC4 | CC4 IS NEW CARRIER TYPE, AND CELL INDEX (CC4) |
| 101 | | |
| 110 | | |
| 111 | | |

FIG.7

RADIO BASE STATION, USER TERMINAL AND RADIO COMMUNICATION METHOD

TECHNICAL FIELD

The present invention relates to a radio base station, a user terminal and a radio communication method in a next-generation mobile communication system.

BACKGROUND ART

In a UMTS (Universal Mobile Telecommunications System) network, long-term evolution (LTE) is under study for the purposes of further increasing high-speed data rates, providing low delay and so on (non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-advanced" or "LTE enhancement" (hereinafter referred to as "LTE-A")) are under study for the purpose of achieving further broadbandization and increased speed beyond LTE. In LTE-A (Rel. 10), carrier aggregation (CA), whereby a plurality of component carriers (CCs), in which the system band of the LTE system is one unit, are grouped to achieve broadbandization, is used. Also, in LTE-A, a HetNet (Heterogeneous Network) structure to use interference coordination technology (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, future systems (Rel-12 and later versions) anticipate carrier aggregation that takes into account improvement of spectral efficiency and reduction of interference caused in a HetNet. Although reference signals such as conventional CRSs (Cell-specific Reference Signals) may be used in carrier aggregation in a HetNet, in this case, there is a concern that a problem might arise from the perspective of reduction of interference to be caused.

Consequently, in order to realize carrier aggregation that takes into account reduction of interference to be caused, a study is in progress to define a new carrier for user terminals that support future systems (for example, Rel. 12 and later versions). However, when there are many user terminals (for example, user terminals of Rel. 11 and earlier versions) that do not support the new carrier in a system, there is a threat that the newly defined carrier cannot be used effectively enough.

The present invention has been made in view of the above, and it is therefore an object of the present invention to provide a radio base station, a user terminal and a radio communication method that allow effective use of frequency resources even when a plurality of user terminals of varying capabilities coexist.

Solution to Problem

The radio base station of the present invention is a radio base station to communicate with a user terminal by using a plurality of component carriers, and this radio base station has a configuration section that configures a subframe of a first carrier type, which a plurality of user terminals of varying capabilities each can receive, and a subframe of a second carrier type, which part of the plurality of user terminals can receive, in component carriers, and a transmission section that transmits downlink signals to the user terminal by using the first carrier type and the second carrier type, and the configuration section configures the subframe of the first carrier type and the subframe of the second carrier type, on a dynamically changing basis, in at least one of the plurality of component carriers.

Advantageous Effects of Invention

According to the present invention, it is possible to make effective use of frequency resources even when a plurality of user terminals of varying capabilities coexist.

BRIEF DESCRIPTION OF DRAWINGS

FIG. 2 provides diagram to explain carrier types;

FIG. 6 provides diagrams to explain CIFs when cross carrier scheduling is applied;

FIG. 7 is a diagram to show an example of a table to lay out the relationships among CIF bits, CC indicators and carrier type information;

DESCRIPTION OF EMBODIMENTS

Figure 1:
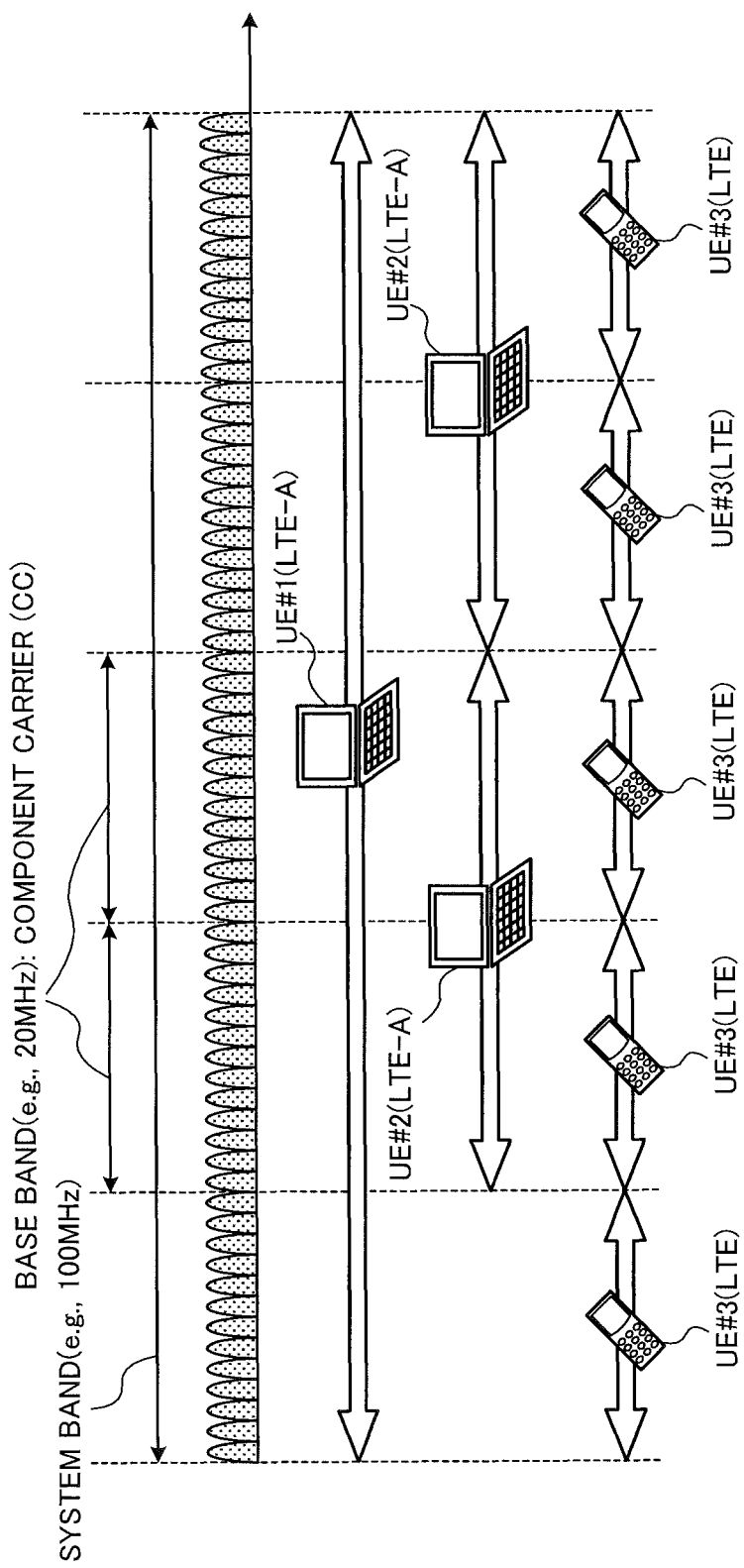
FIG. 1 is a diagram to explain the system band of an LTE-A system

FIG. 1 is a diagram to show a layered bandwidth structure defined in LTE-A. The example shown in FIG. 1 is a layered bandwidth structure that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, user terminal UE (User Equipment) #1 is a user terminal to support the LTE-A system (and also support the LTE system), and is able to support a system band up to 100 MHz. UE #2 is a user terminal to support the LTE-A system (and also support the LTE system), and is able to support a system band up to 40 MHz (20 MHz×2=40 MHz). UE #3 is a user terminal to support the LTE system (and not support the LTE-A system), and is able to support a system band up to 20 MHz (base band).

Future systems (Rel-11 and later versions) anticipate expansion of carrier aggregation specialized for a HetNet. In this case, in order to realize carrier aggregation that takes into account reduction of interference in a HetNet, a study is in progress to introduce a new carrier that has no compatibility with the component carriers of conventional carrier aggregation. A carrier like this, which only specific user terminals (for example, user terminals of Rel. 12 and later versions) use on a selective basis, is referred to as a "new carrier type (NCT)." Note that a new carrier may also be referred to as an "additional carrier type" or an "extension carrier" as well.

Next, the carrier types will be described with reference to FIG. 2. FIG. 2A shows an example of a legacy carrier type, and FIG. 2B shows an example of a new carrier type (NCT). Note that, in FIG. 2, for ease of explanation, only CRSs, a PDCCH (Physical Downlink Control Channel) and a PDSCH (Physical Downlink Shared Channel) are illustrated.

In the legacy carrier type, as shown in FIG. 2A, PDCCH is configured at the top in one resource block defined in LTE, over maximum three OFDM symbols. Also, in the legacy carrier type, CRSs are configured not to overlap user data and other reference signals such as DM-RSs (Demodulation Reference Signals) and in one resource block.

The CRSs are used in cell search, channel estimation and so on, and are mapped to a plurality of resource elements according to predetermined rules. Also, when a number of antenna ports are provided, CRSs corresponding to respective antenna ports are mapped to mutually varying resource elements, and are orthogonally multiplexed by means of time division multiplexing (TDM)/frequency division multiplexing (FDM).

Note that the legacy carrier type shown in FIG. 2A is supported by conventional user terminals (for example, UEs of Rel. 11 and earlier versions) and by new user terminals (for example, UEs of Rel. 12 and later versions). Meanwhile, the new carrier type is supported by specific user terminals (for example, UEs of Rel. 12 and later versions), but is not supported by (or has no backward compatibility with) other users (for example, UEs of Rel. 11 and earlier versions). Also, the new carrier type is primarily assumed for use in Scells (Secondary Cells).

The new carrier type may be, for example, structured not to transmit CRSs (see FIG. 2B) or to transmit part of the signals on a selective basis. Given CRSs, transmitting part of the signals may refer to, for example, a case where the CRS to correspond to one antenna port is transmitted in a longer time cycle (for example, a 5-msec cycle) than conventional CRSs (which are multiplexed in all subframes), and so on. In this case, it is possible to allocate user data to the resources for the conventional CRSs in the new carrier type.

Also, in the new carrier type, it is possible to use DM-RSs in data demodulation, and use CSI-RSs (Channel State Information-Reference Signals) in CSI measurements.

Furthermore, the new carrier type may be structured not to transmit downlink control channels (PDCCH, PHICH, PCFICH), or to transmit part of the signals on a selective basis. In this case, it is possible to allocate user data to the radio resources for conventional downlink control channels in the new carrier type. Meanwhile, in the new carrier type, an enhanced PDCCH (EPDCCH: Enhanced Physical Downlink Control Channel) can be transmitted. The EPDCCH is a control channel that is arranged to be frequency-division-multiplexed with the PDSCH for downlink data signals, and can be used to report scheduling information, system information that is transmitted in broadcast signals, and so on. Also, the EPDCCH can be demodulated using DM-RSs.

Furthermore, in the new carrier type, it is possible not to transmit broadcast signals, or transmit part of the signals on a selective basis. In this case, it is possible to allocate user data to the resources for conventional broadcast signals in the new carrier type.

Note that, although a case is shown with the new carrier type shown in FIG. 2 where CRSs, downlink control channels and broadcast signals are not transmitted, this structure is by no means limiting. The new carrier type has only to be structured to support specific user terminals (for example, UEs of Rel. 12 and later versions) and not support (or not have compatibility with) other user terminals (for example, UEs of Rel. 11 and earlier versions). For example, the new carrier type may be structured not to transmit at least one of CRSs, downlink control channels and broadcast signals. Also, the bandwidth of the new carrier type needs not to use the system band of the LTE system (base band: 20 MHz) as one unit, and can be changed as appropriate.

Next, a scenario to use the new carrier type will be described with reference the accompanying drawings. FIG. 3 provides diagrams to show an example of a system structure where the new carrier type is used. Note that the user terminals in FIG. 3 are specific user terminals (for example, UEs of Rel. 12 and later versions) that support the new carrier type.

Figure 3A:
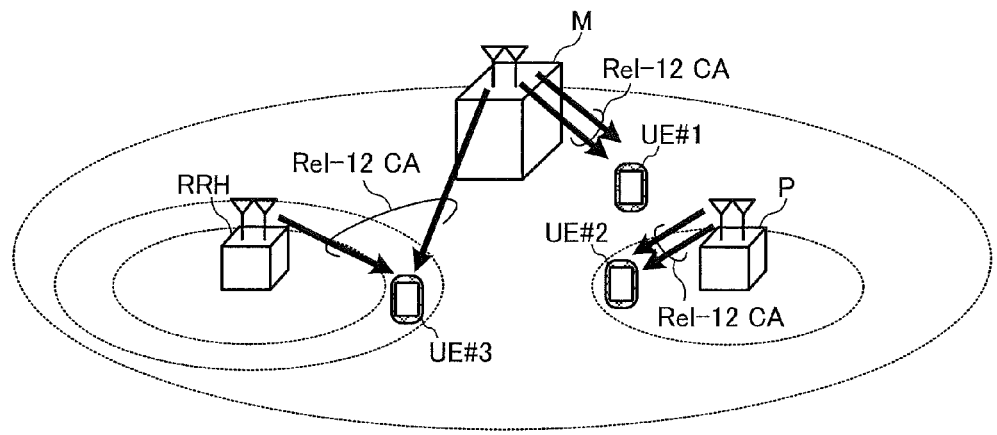
FIG. 3 provides diagrams to show an example of a system structure using a new carrier type.

The system illustrated in FIG. 3A is formed in layers with a macro base station M (Macro eNodeB), a pico base station P (Pico eNodeB) and a small base station RRH (Remote Radio Head). In the cell of the macro base station M, small cells are formed, in a localized manner, by the pico base station P and the small base station RRH. User terminal UE #1 is connected with the macro base station M, and user terminal UE #2 is connected with the pico base station P. User terminal UE #3 is connected to the macro base station M and the small base station RRH. User terminals UE #1 to #3 each communicate with the radio base stations by carrier aggregation.

User terminal UE #2 is located in the cell of the pico base station P, where the received power from the pico base station P is greater than the received power from the macro base station M. Consequently, in user terminal UE #2, interference from the downlink data of the macro base station M has little influence on the downlink data of the pico base station P. However, from the macro base station M, the CRS is transmitted all over the cell of the macro base station M, and therefore cases might occur where interference from this CRS against the downlink data of the pico base station P poses a problem.

Figure 3B:
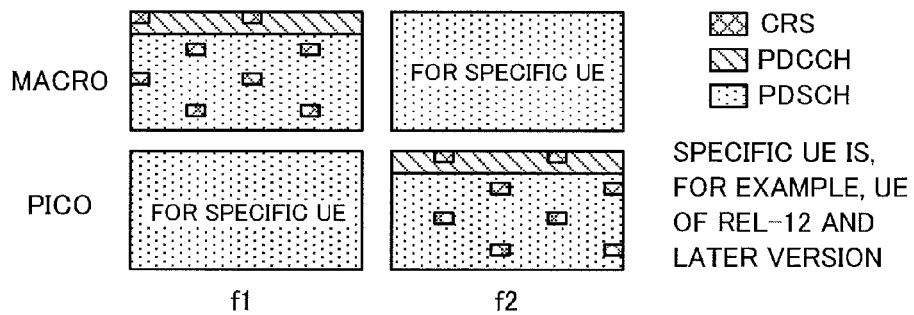

Consequently, as shown in FIG. 3B, as the macro base station M executes carrier aggregation using both a legacy carrier type (f1) and a new carrier type (f2), it becomes possible to reduce the interference by the CRS of the macro base station in f2. That is, by not transmitting CRSs or by transmitting part of the CRSs on a selective basis in the new carrier type, it is possible to reduce the interference that is caused by the CRSs against the downlink data of the pico base station P, and improve the quality of transmission. Also, if the new carrier type is structured so that downlink data is allocated to the resources for CRSs or the PDCCH, it is possible to improve spectral efficiency.

User terminal UE #3 is located in a place where connection with the small base station RRH is possible, so that user terminal UE #3 can execute carrier aggregation using the new carrier type with the small base station RRH while being connected with the macro base station M.

Figure 3C:
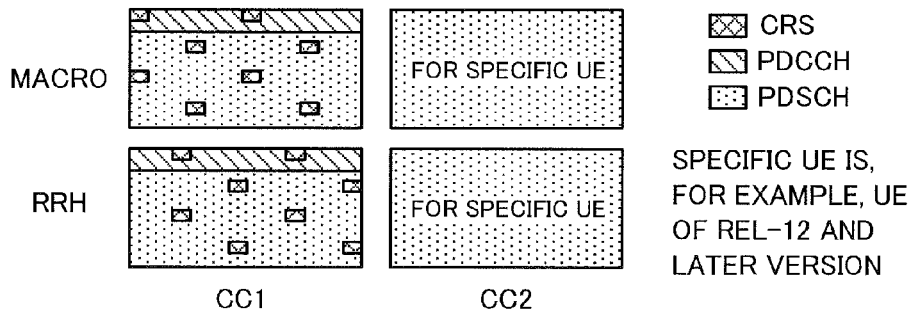

For example, as shown in FIG. 3C, user terminal UE #3 receives downlink data, with the PDCCH and the CRS, from the macro base station M by a component carrier CC1 of the legacy carrier type. Also, user terminal UE #3 receives downlink data from the small base station RRH by a component carrier CC2 of the new carrier type. Also, by structuring the new carrier type so that downlink data is transmitted in the resources for conventional CRSs and the PDCCH, it is possible to improve spectral efficiency.

The new carrier type defined in this way has no compatibility with conventional user terminals (for example, UEs of Rel. 11 and earlier versions) that support the legacy carrier type, as noted earlier. Consequently, user terminals of Rel. 11 and earlier versions have difficulty using the new carrier type for the Pcell or Scell in carrier aggregation. In particular, since synchronization cannot be established in a scenario in which communication is carried out using a plurality of carriers of varying frequency bands (inter-band CA), it becomes difficult to use the new carrier type.

Consequently, when, as shown in FIG. 3, the legacy carrier is applied to CC1 serving as the Pcell and the new carrier type is applied to CC2 serving as the Scell, the Scell can use only specific user terminals (for example, UEs of Rel. 12 and later versions), and therefore other user terminals cannot adopt carrier aggregation. Consequently, when there are many conventional user terminals that cannot use the new carrier type (for example, an environment in an earlier stage of introduction of Rel. 12, and so on), it may become difficult to introduce the new carrier type.

So, the present inventors have found out that, by configure the new carrier type by taking into account the presence of conventional user terminals, it becomes possible to make effective use of frequency resource even in an environment in which a plurality of user terminals of varying capabilities coexist.

To be more specific, for part of or all of a plurality of component carriers (CCs), subframes of a first carrier type (legacy carrier), which a plurality of user terminals of varying capabilities each can receive, and subframes of a second carrier type (new carrier type), which specific user terminals can receive, are configured on a dynamically changing basis. By this means, compared to the case where subframes of the new carrier type are configured in predetermined component carriers on a fixed basis, it is possible to allow conventional user terminals to use these predetermined component carriers. As a result of this, even in an environment in which a plurality of user terminals of different capabilities coexist, it is possible to make effective use of frequency resources.

Also, as a method of allow a user terminal to determine the carrier type (whether or not subframes of the new carrier type are configured), the present inventors have conceived of employing a method of reporting configuration information of subframes of the new carrier type from a radio base station to user terminals explicitly (explicit), or a method of reporting this information implicitly (implicit). Now, an embodiment of the present embodiment will be described below in detail with reference to the accompanying drawings.

<New Carrier Type Configuration Method>

The subframe structure to use when a radio base station configures subframes of the new carrier type in component carriers on a dynamically changing basis will be described with reference to FIG. 4. Note that, although an example with two component carriers (Pcell and Scell) will be described with FIG. 4 as legacy carrier and new carrier type subframe configurations, the number of component carriers is not limited to this.

Figure 4A:
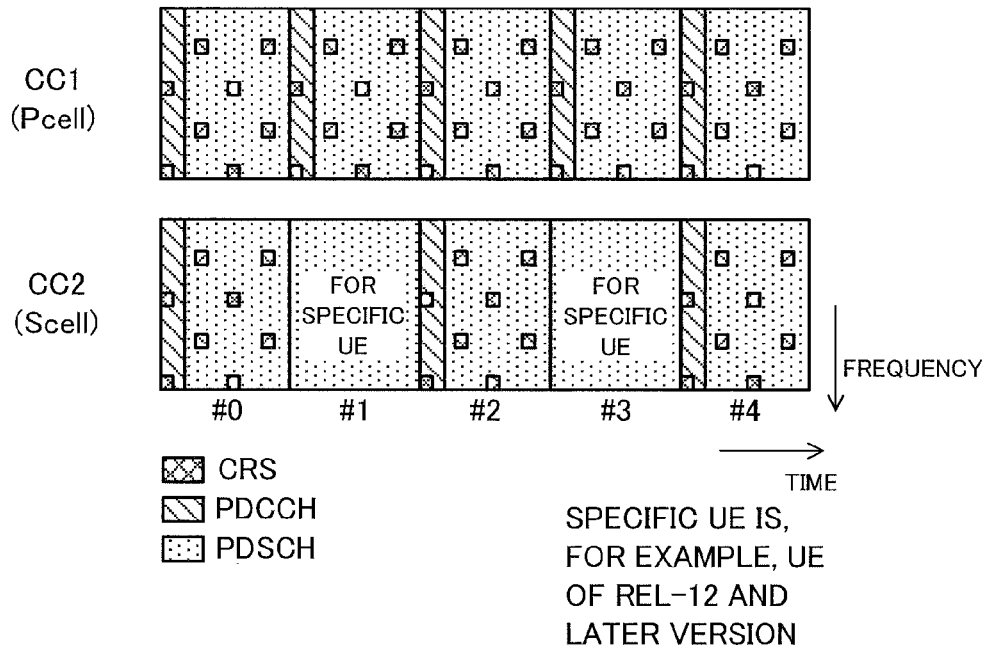
FIG. 4 provides diagrams to show examples of a subframe structure where varying carrier types are configured.

FIG. 4A illustrates a case where subframes of the legacy carrier are configured in the Pcell and subframes of the legacy carrier and the new carrier type are configured in the Scell. That is, in the Scell, subframes of the legacy carrier and the new carrier type are changed dynamically and configured along the time direction. The radio base station selects and configures the carrier type adequately, by taking into account the presence of conventional user terminals (for example, UEs of Rel. 11 and earlier versions) and specific user terminals (UEs of Rel. 12 and later versions).

To be more specific, in subframes #0, #2 and #4, the legacy carrier type is configured in the Pcell and the Scell. Consequently, in subframes #0, #2 and #4, both conventional user terminals (for example, UEs of Rel. 11 and earlier versions) and specific user terminals (UEs of Rel. 12 and later versions) are capable of communication using carrier aggregation. Meanwhile, in subframes #1 and #3, the legacy carrier type is configured in the Pcell, and the new carrier type is configured in the Scell. Consequently, in subframes #1 and #3, specific user terminals to support the new carrier type are capable of communication using carrier aggregation.

Note that, in subframes #1 and #3, even conventional user terminals are capable of communication not using carrier aggregation (communication to use CC1). In this case, the radio base station controls the conventional user terminals not to use carrier aggregation in subframes #1 and #3.

That is, in FIG. 4A, compared to the case where CC1 is configured as the subframe for the legacy carrier and CC2 is configured as the subframe for the new carrier type on a fixed basis, it is possible to configure the legacy carrier in part of the region for the new carrier type in the time/frequency domain.

In this way, by configuring not only subframes of the new carrier type for the Scell, but also by configuring subframes of the legacy carrier type in part, it is possible to allow user terminals that do not support the new carrier type to use the Scell (adopt carrier aggregation). By employing this structure, even in the situation where many conventional user terminals are present in the system, it is still possible to adequately configure the new carrier type, so that it is possible to make effective use of frequency resources.

Figure 4B:
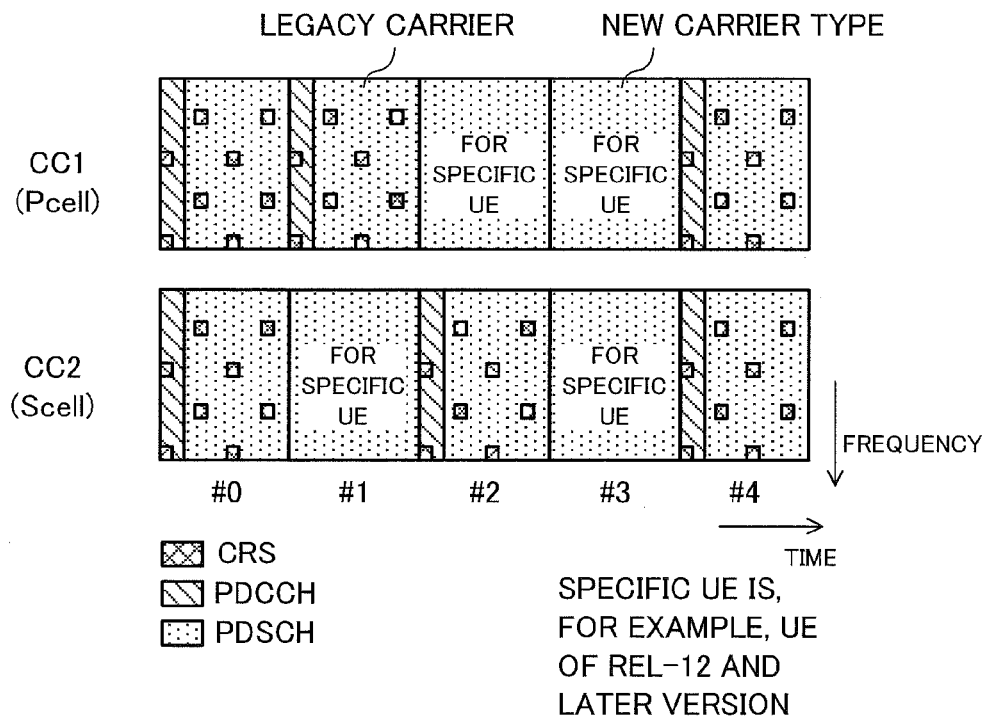

FIG. 4B illustrates a case where subframes of the legacy carrier type and the new carrier type are configured in both the Pcell and the Scell. That is, in both the Pcell and the Scell, subframes of the legacy carrier type and the new carrier type are changed dynamically and configured along the time direction.

To be more specific, in subframes #0 and #4, the legacy carrier type is configured in the Pcell and the Scell. Consequently, in subframes #0 and #4, both conventional user terminals (for example, UEs of Rel. 11 and earlier versions)

and specific user terminals (UEs of Rel. 12 and later versions) are capable of communication using carrier aggregation. Meanwhile, in subframe #1, the legacy carrier type is configured in the Pcell and the new carrier type is configured in the Scell, so that only specific user terminals that support the new carrier type are capable of communication using carrier aggregation.

Note that, in subframe #1, even conventional user terminals are capable of communication not using carrier aggregation (communication to use CC1). In this case, the radio base station controls the conventional user terminal not to use carrier aggregation in subframe #1.

Also, in subframes #2 and #3, the new carrier type is configured in the Pcell. Consequently, in subframes #2 and #3, specific user terminals (UEs of Rel. 12 and later versions) are capable of communication using carrier aggregation.

That is, in FIG. 4B, compared to the case where CC1 is configured as the subframe for the legacy carrier and CC2 is configured as the subframe for the new carrier type on a fixed basis, it is possible to configure the new carrier type in part of the region for the legacy carrier in the time/frequency domain, and furthermore configure the legacy carrier in part of the region for the new carrier type in the time/frequency domain.

In this way, by dynamically changing and configuring subframes of the new carrier type and subframes of the legacy carrier type in the Pcell and the Scell, it is possible to apply carrier aggregation to user terminals that do not support the new carrier type. By employing this structure, even in the situation where many conventional user terminals are present in the system, it is still possible to adequately configure the new carrier type, so that it is possible to make effective use of frequency resources.

Note that, although FIG. 4 shows a case where the legacy carrier and the new carrier type are configured dynamically in subframe units, the present embodiment is by no means limited to this.

<New Carrier Type Configuration Information>

As noted earlier, when subframes of the legacy carrier type and the new carrier type are dynamically changed and configured in component carriers, it is preferable to report the carrier types of subframes to user terminals. By this means, the user terminals can learn the carrier type configured in each component carrier and perform the demodulation process adequately.

As for the method of allowing user terminals to determine the carrier type (whether or not subframes of the new carrier type are configured), there is a method of reporting configuration information of subframes of the new carrier type from a radio base station to user terminals explicitly (explicit), or a method of reporting this information implicitly (implicit). Now, the method of determining the carrier type in the user terminals will be described.

EXAMPLE 1

A case will be described here with example 1 where user terminals identify subframes of the new carrier type, without having configuration information of subframes of the new carrier type signaled from a radio base station to the user terminals.

The radio base station applies signal structures that are different from those of the legacy carrier type, to subframes where the new carrier type is configured. In this case, specific user terminals (for example, UEs of Rel. 12 and later versions) can determine the carrier type (between the new carrier type and the legacy carrier type) by detecting signal structures that are different from the signal structures of the legacy carrier.

As for the signal structures, synchronization signals, broadcast signals, reference signals and/or the like may be used. For example, the radio base station multiplexes the synchronization signals in the new carrier type in positions that are different from those in the legacy carrier type. The synchronization signals include the PSS (Primary Synchronization Signal) and the SSS (Secondary Synchronization Signal).

The radio base station multiplexes the PSS and/or the SSS in different positions between the new carrier type and the legacy carrier type. Then, specific user terminals can determine the carrier type applied to each subframe by detecting the PSS and/or the SSS in cell search and so on.

Note that the signal structures are by no means limited to synchronization signals, and it is equally possible to employ structures to multiplex other signals (broadcast signals, reference signals and so on) at different positions between the new carrier type and the legacy carrier type.

EXAMPLE 2

A case will be described here with example 2 where configuration information of subframes of the new carrier type is signaled from a radio base station to user terminals, so that the user terminals can identify subframes of the new carrier type.

The radio base station can report information related to the carrier type (whether or not the new carrier type is configured) to user terminals by using higher layer signaling (broadcast signals, RRC signaling and so on) or by using downlink control information (DCI).

When the radio base station carries out this reporting by using broadcast signals, the radio base station multiplexes information to indicate the carrier type in the broadcast signals (MIBs (Master Information Blocks) and SIBs (System Information Blocks)), and reports these signals to the user terminals. The user terminals, by receiving the broadcast signals, can identify the carrier type applied to each component carrier's subframe. The information to be included in the broadcast signals is not particularly limited as long as the information allows the user terminals to identify each subframe's carrier type.

When the radio base station carries out this reporting by using RRC signaling, the radio base station reports information (carrier type information) that indicates the subframe positions where the new carrier type or the legacy carrier type is multiplexed, semi-statically to the user terminals.

To be more specific, by making it possible to configure subframes of the new carrier type (on/off), the radio base station configures "new carrier type_presense," which indicates whether or not the new carrier type is present, among the information elements (IEs) of RRC signaling. The user terminals can identify the carrier type (the new carrier type or the legacy carrier type) by detecting the IEs (new carrier type_presense) included in RRC signaling. In this case, in the RRC signaling information elements, "new carrier type_presense" may be newly defined as a BOOLEAN (fundamental data format to assume the two values of "true" and "false") to represent whether or not the new carrier type is present.

Figure 5:
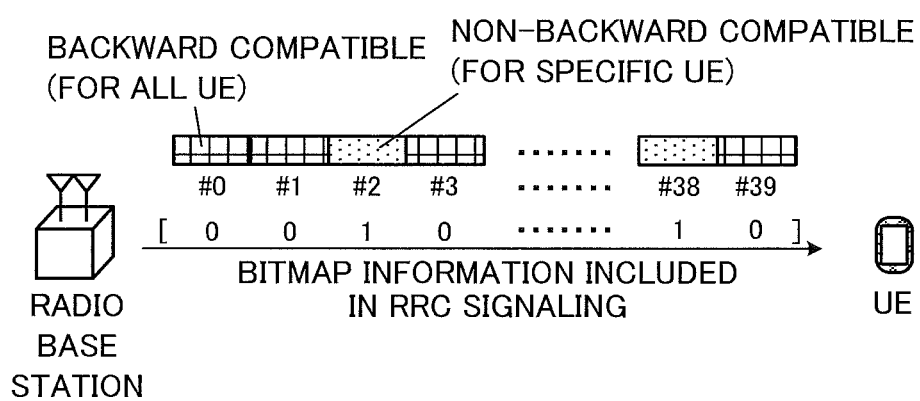
FIG. 5 is a diagram to show an example of a carrier type signaling method.

Also, as another reporting method to use RRC signaling, it is equally possible to report the new carrier type (or the legacy carrier type) multiplexing positions to the user terminal by using bitmap information. To be more specific, in which subframes among subframes over a predetermined period (for example, 40 msec) the new carrier type is multiplexed is reported to the user terminals. For example, as bitmap information to bridge over multiple subframes, it is possible to report subframes where the new carrier type is multiplexed as "1" and subframes where the legacy carrier type is multiplexed as "0" (see FIG. 5), to the user terminals.

Furthermore, as another reporting method to use RRC signaling, it is also possible to report the new carrier type (or the legacy carrier type) multiplexing positions to the user terminals by using conventional RRC signaling information. In this case, for example, the mechanism of cross carrier scheduling can be used as the conventional RRC signaling information.

Cross carrier scheduling refers to, for example, as shown in FIGS. 6A and 6B, multiplexing and transmitting downlink control information for the PUSCH that is transmitted in transmission point TP1 (cell 1) on the PDCCH of another transmission point TP0 (cell 0) when carrier aggregation (CA) is employed. At this time, in order to identify to which transmission point's PDSCH each piece of downlink control information correspond to, a DCI format, in which a CIF (Carrier Indicator Field) for configuring the carrier indicator (CI) (or the CC indicator) is added, is employed (see FIGS. 6B and 6C). FIG. 6C shows a table to define the relationship between CIF bits and CC indicators.

That is, the CIF is a field to represent the carrier indicator (CI), and, when cross carrier scheduling is executed, a user terminal can specify the cell (CC) where the PDSCH to be demodulated is multiplexed, based on the bits defined in the CIF. Note that the radio base station reports the CC indicators to user terminals by using RRC signaling.

With the present embodiment, information combining cell indices that identify the CCs and the carrier type (whether or not the carrier type is the new carrier type) is reported from the radio base station to user terminals by RRC signaling. The user terminals can identify the cell indices, as well as whether or not the new carrier type is used, based on the RRC signaling reported.

For example, in addition to the CC indicators corresponding to respective CIF bits, the radio base station can also report information about the carrier type of each cell index (see FIG. 7) to the user terminals by RRC signaling. FIG. 7 shows a case where the legacy carrier is configured in CC0 and the new carrier type is configured in CC1 to CC4. The user terminals can identify the carrier type configured in each CC based on the information related to carrier types reported from the radio base station (for example, the table shown in FIG. 7).

Also, the present embodiment may preferably be structured so that information as to whether or not a user terminal is capable of receiving subframes of the new carrier type (user terminal capability information (UE capability information) is reported from the user terminal to the radio base station. By this means, the radio base station can be structured to report information related to each component carrier's carrier type (for example, see FIG. 7), on a selective basis, by using RRC signaling and so on, to user terminals that can use the new carrier type.

That is, the radio base station makes user terminals report user terminal capability information as to whether or not the user terminals can support the new carrier type (capability signaling), and determines the carrier type to configure in each component carrier's subframes based on the user terminal capability information. Then, the radio base station reports information related to the carrier type to configure in each component carrier to the user terminals by using broadcast signals, RRC signaling and so on. Note that, as for the time to transmit user terminal capability information from the user terminals to the radio base station, it is possible to use a predetermined time after RRC connection is established.

(Radio Communication System)

Figure 8:
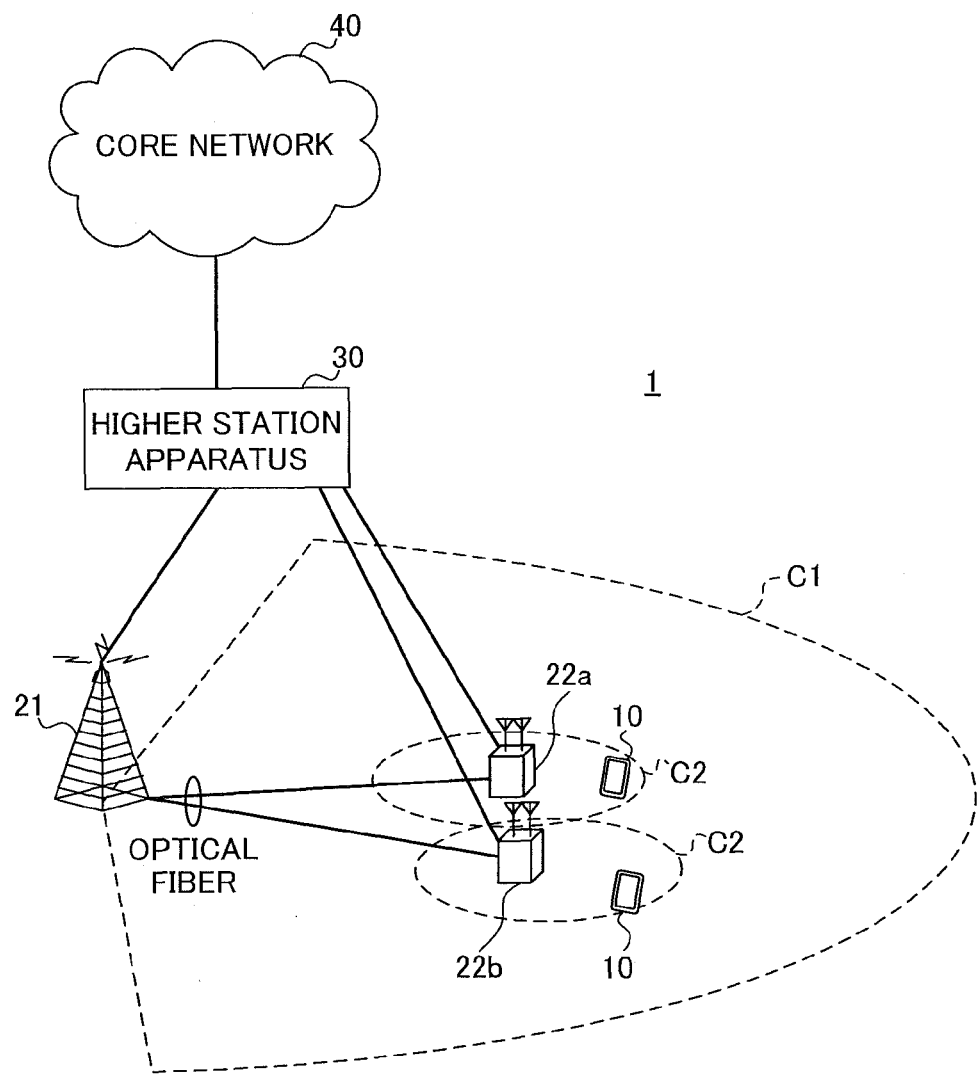
FIG. 8 is a diagram to explain a system structure of a radio communication system.

Now, the radio communication system according to the present embodiment will be described below in detail. FIG. 8 is a schematic structure diagram of the radio communication system according to the present embodiment. Note that the radio communication system shown in FIG. 8 is a system to accommodate, for example, the LTE system or SUPER 3G. This radio communication system adopts carrier aggregation to group a plurality of fundamental frequency blocks (component carriers) into one, where the system band of the LTE system constitutes one unit. Also, this radio communication system may be referred to as "IMT-advanced," or may be referred to as "4G" or "FRA (Future Radio Access)."

The radio communication system 1 illustrated in FIG. 8 includes a radio base station 21 that forms a macro cell C1, and radio base stations 22a and 22b that form small cells C2, which are placed inside the macro cell C1 and which are narrower than the macro cell C1. Also, in the macro cell C1 and in each small cell C2, user terminals 10 are placed. The user terminals 10 are structured to be able to perform radio communication with both the radio base station 21 and the radio base stations 22.

Communication between the user terminals 10 and the radio base station 21 is carried out using a carrier of a relatively low frequency band (for example, 2 GHz) and a wide bandwidth (referred to as the "legacy carrier" and so on). Meanwhile, although a carrier of a relatively high frequency band (for example, 3.5 GHz and so on) and a narrow bandwidth may be used between the user terminals 10 and the radio base stations 22, the same carrier as that used between the user terminals 10 and the radio base station 11 may be used as well. The radio base station 21 and each radio base station 22 are connected by wire connection or by wireless connection.

The radio base station 21 and the radio base stations 22 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 22 may be connected with the higher station apparatus via the radio base station 21.

Note that the radio base station 21 is a radio base station having a relatively wide coverage, and may be referred to as an "eNodeB," a "radio base station," a "transmission point" and so on. Also, the radio base stations 22 are radio base stations having local coverages, and may be referred to as "pico base stations," "femto base stations," "Home eNodeBs," "RRHs (Remote Radio Heads)," "micro base stations," "transmission points" and so on. The radio base stations 21 and 22 will be hereinafter collectively referred to as "radio base station 20," unless distinction is drawn otherwise. The user terminals 10 are terminals to support various communication schemes such as LTE and LTE-A (for example, UEs of Rel. 11 and earlier versions and UEs of Rel. 12 and later versions), and may include mobile communication terminals as well as fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Here, communication channels to be used in the radio communication system shown in FIG. 8 will be described. Downlink communication channels include a PDSCH (Physical Downlink Shared Channel), which is used by each user terminal 10 on a shared basis, and downlink L1/L2 control channels (PDCCH, PCFICH, PHICH and EPD-CCH). User data and higher control information are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel). Also, the scheduling information for the PDSCH and the PUSCH and so on may be transmitted by the EPDCCH (Enhanced PDCCH) as well. This EPDCCH can be arranged to be frequency-division-multiplexed with the PDSCH (downlink shared data channel).

Uplink communication channels include the PUSCH (Physical Uplink Shared Channel), which is used by each user terminal 10 on a shared basis as an uplink data channel, and the PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Next, an overall structure of a radio base station according to the present embodiment will be described with reference to FIG. 9.

The radio base station 20 has transmitting/receiving antennas 201, amplifying sections 202, transmitting/receiving sections (transmitting section/receiving sections) 203, a baseband signal processing section 204, a call processing section 205 and a transmission path interface 206. Transmission data to be transmitted from the radio base station 20 to a user terminal 10 on the downlink is input from the higher station apparatus 30, into the baseband signal processing section 204, via the transmission path interface 206.

In the baseband signal processing section 204, a downlink data channel signal is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process. Furthermore, the signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the radio base station 20, to the user terminals 10 connected to the same cell, by a broadcast channel. The control information for communication in the cell includes, for example, the uplink or downlink system bandwidth, root sequence identification information (root sequence index) for generating random access preamble signals in the PRACH and so on.

Each transmitting/receiving section 203 converts baseband signals output from the baseband signal processing section 204 into a radio frequency band. The amplifying sections 202 amplify the radio frequency signals having been subjected to frequency conversion, and transmit the results through the transmitting/receiving antennas 201. Note that the transmitting/receiving sections 203 function as a transmitting section to transmit information related to carrier types, and as a receiving section to receive user terminal capability information. Furthermore, the transmitting section is also able to transmit downlink signals by using varying carrier types.

On the other hand, as for signals to be transmitted from the user terminal 10 to the radio base station 20 on the uplink, radio frequency signals that are received in the transmitting/receiving antennas 201 are each amplified in the amplifying sections 202, converted into baseband signals through frequency conversion in the transmitting/receiving sections 203, and input in the baseband signal processing section 204.

In the baseband signal processing section 204, the transmission data that is included in the baseband signals that are received on the uplink is subjected to an FFT (Fast Fourier Transform) process, an IDFT (Inverse Discrete Fourier Transform) process, error correction decoding, a MAC retransmission control receiving process, and RLC layer and PDCP layer receiving processes. The decoded signals are transferred to the higher station apparatus 30 via the transmission path interface 206.

The call processing section 205 performs call processing such as setting up and releasing communication channels, manages the state of the radio base station 20 and manages the radio resources.

Figure 9:
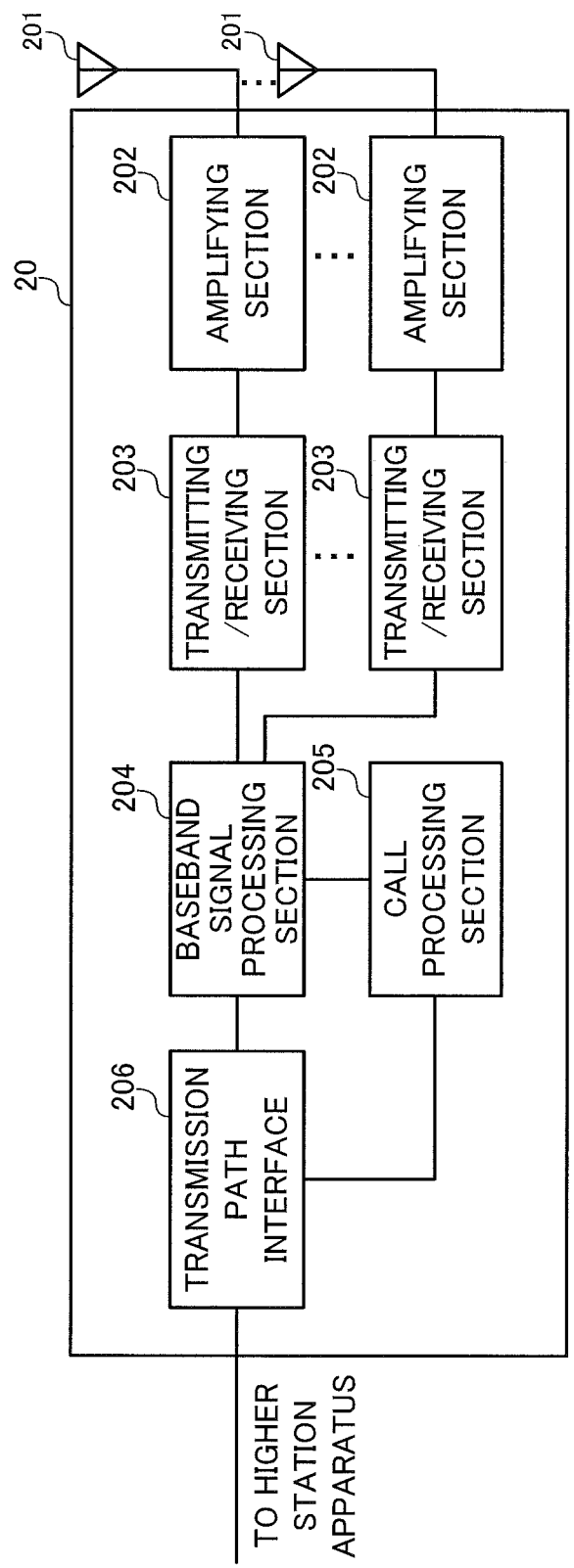
FIG. 9 is a diagram to explain an overall structure of a radio base station.
Figure 10:
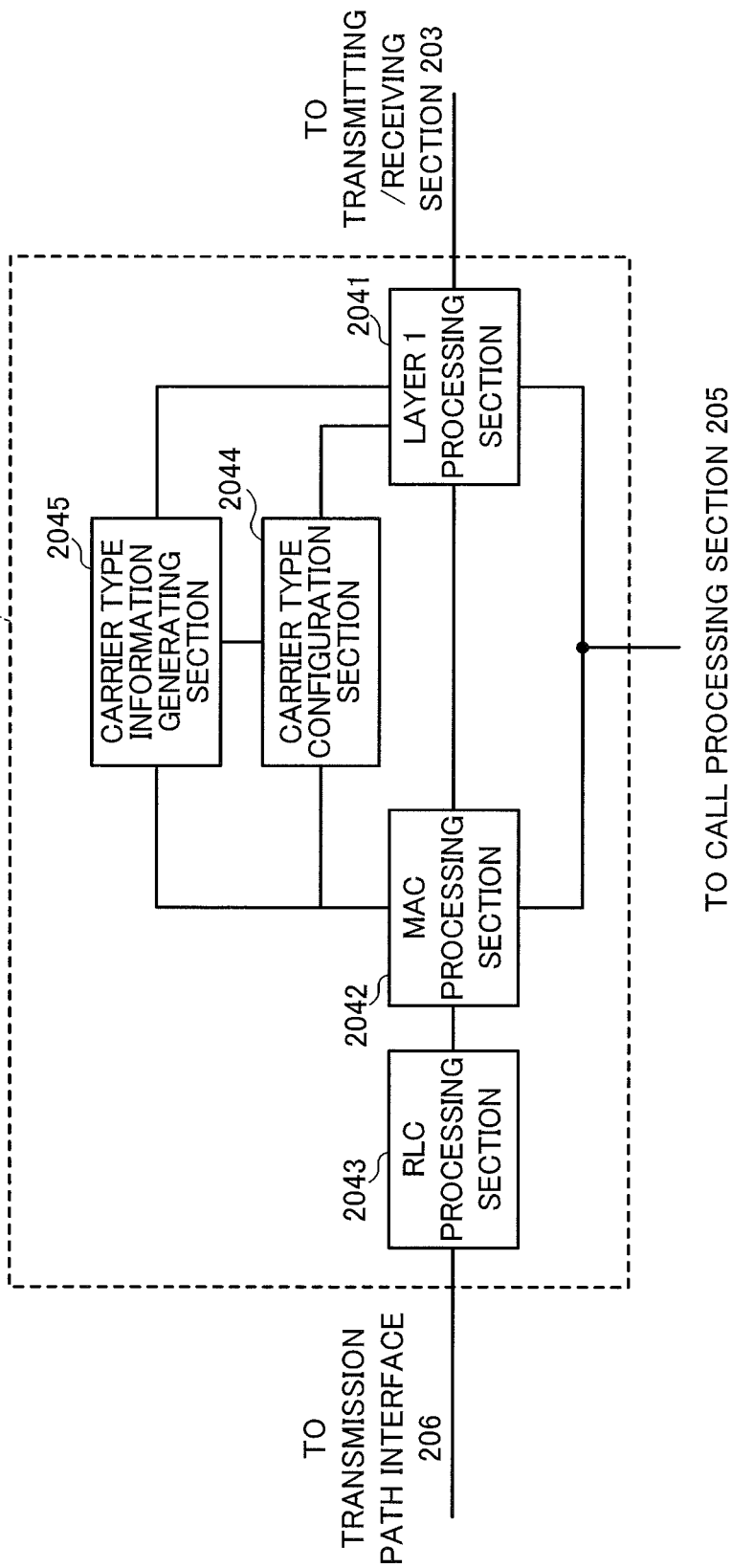
FIG. 10 is a functional block diagram to show a baseband signal processing section provided in a radio base station, and part of higher layers.

FIG. 10 is a block diagram to show the structure of the baseband signal processing section provided in the radio base station shown in FIG. 9. The baseband signal processing section 204 is primarily formed with a layer 1 processing section 2041, a MAC processing section 2042, an RLC processing section 2043, a carrier type configuration section 2044 and a carrier type information generating section 2045.

The layer 1 processing section 2041 primarily performs processes pertaining to the physical layer. For example, the layer 1 processing section 2041 applies processes to signals received on the uplink, including channel decoding, a discrete Fourier transform (DFT), frequency demapping, an inverse fast Fourier transform (IFFT), data demodulation and so on. Also, the layer 1 processing section 2041 performs processes for signals to transmit on the downlink, including channel coding, data modulation, frequency mapping and an inverse fast Fourier transform (IFFT) and so on.

The MAC processing section 2042 performs processes for signals that are received on the uplink, including MAC layer retransmission control, scheduling of the uplink/downlink, transport format selection for the PUSCH/PDSCH, resource block selection for the PUSCH/PDSCH, and so on. The RLC processing section 2043 performs, for packets that are received on the uplink/packets to transmit on the downlink, packet division, packet coupling, RLC layer retransmission control and so on.

The carrier type configuration section 2044 determines the carrier type to use to transmit downlink signals, and controls the configuration of the determined carrier type in subframes. For example, the carrier type configuration section 2044 determines the carrier type for each subframe by taking into account the presence of conventional user terminals (for example, UEs of Rel. 11 and earlier versions) and specific user terminals (for example, UEs of Rel. 12 and later versions). Then, the carrier type configuration section 2044 controls the configuration of the determined carrier type in subframes.

To be more specific, the carrier type configuration section 2044 can control the configuration of subframes so that subframes of the new carrier type change dynamically in accordance with the number of conventional user terminals (for example, UEs of Rel. 11 and earlier versions) that are present in the system. For example, it is possible to configure fewer subframes of the new carrier type in the situation where there are many conventional user terminals 10 in the system, and configure more subframes of the new carrier type in the situation where there are few conventional user terminals 10 in the system.

Also, the carrier type configuration section 2044 may be structured to control the cycle of configuring subframes of the new carrier type depending on the proportion of user terminals of varying capabilities and so on. User terminals of varying capabilities can be identified based on user terminal capability information reported from the user terminals. Note that it is possible to employ a structure to control the carrier type in each subframe in the scheduling section, and control the configuration of the carrier types determined in the carrier type configuration section 2044 in subframes.

The carrier type information generating section 2045 generates information related to the carrier types configured in the carrier type configuration section 2044. The carrier type information generated in the carrier type information generating section 2045 is reported to user terminals by using higher layer signaling (broadcast signals, RRC signaling and so on) or by using downlink control information (DCI).

For example, when the carrier type information is reported by using RRC signaling, the method of configuring and transmitting "new carrier type_presense," which shows whether or not the new carrier type is present, in the RRC signaling information elements, the method of reporting this information by using bitmap information (see FIG. 5 above), the method of using conventional RRC signaling information (for example, cross carrier scheduling) (see FIG. 7 above) and so on may be used.

Also, the radio base station may apply signal structures that are different from those of the legacy carrier type to subframes where the new carrier type is configured based on the result determined in the carrier type configuration section 2044, instead of signaling carrier type information to user terminals. For example, it is possible to multiplex the synchronization signals (or broadcast signals, reference signals and so on) in the new carrier type in different positions from those in the legacy carrier type.

Next, an overall structure of a user terminal according to the present embodiment will be described with reference to FIG. 11. LTE terminals and LTE-A terminals have the same hardware structures in principle parts, and therefore will be described without drawing distinction between them. A user terminal 10 has transmitting/receiving antennas 101, amplifying sections 102, transmitting/receiving sections (transmitting section/receiving section) 103, a baseband signal processing section 104 and an application section 105.

As for downlink data, radio frequency signals that are received in the transmitting/receiving antennas 101 are amplified in the amplifying sections 102, and converted into baseband signals through frequency conversion in the transmitting/receiving sections 103. The baseband signals are subjected to an FFT process, error correction decoding, a retransmission control receiving process and so on, in the baseband signal processing section 104. In this downlink data, downlink transmission data is transferred to the application section 105. The application section 105 performs processes related to higher layers above the physical layer and the MAC layer, and so on. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process and an IFFT process. The baseband signal that is output from the baseband signal processing section 104 is converted into a radio frequency band in the transmitting/receiving sections 103. After that, the amplifying section 102 amplifies the radio frequency signal having been subjected to frequency conversion, and transmits the result from the transmitting/receiving antenna 101.

Note that the transmitting/receiving sections 103 function as a transmitting section to transmit user terminal capability information, and as a receiving section to receive information related to the carrier types.

Figure 11:
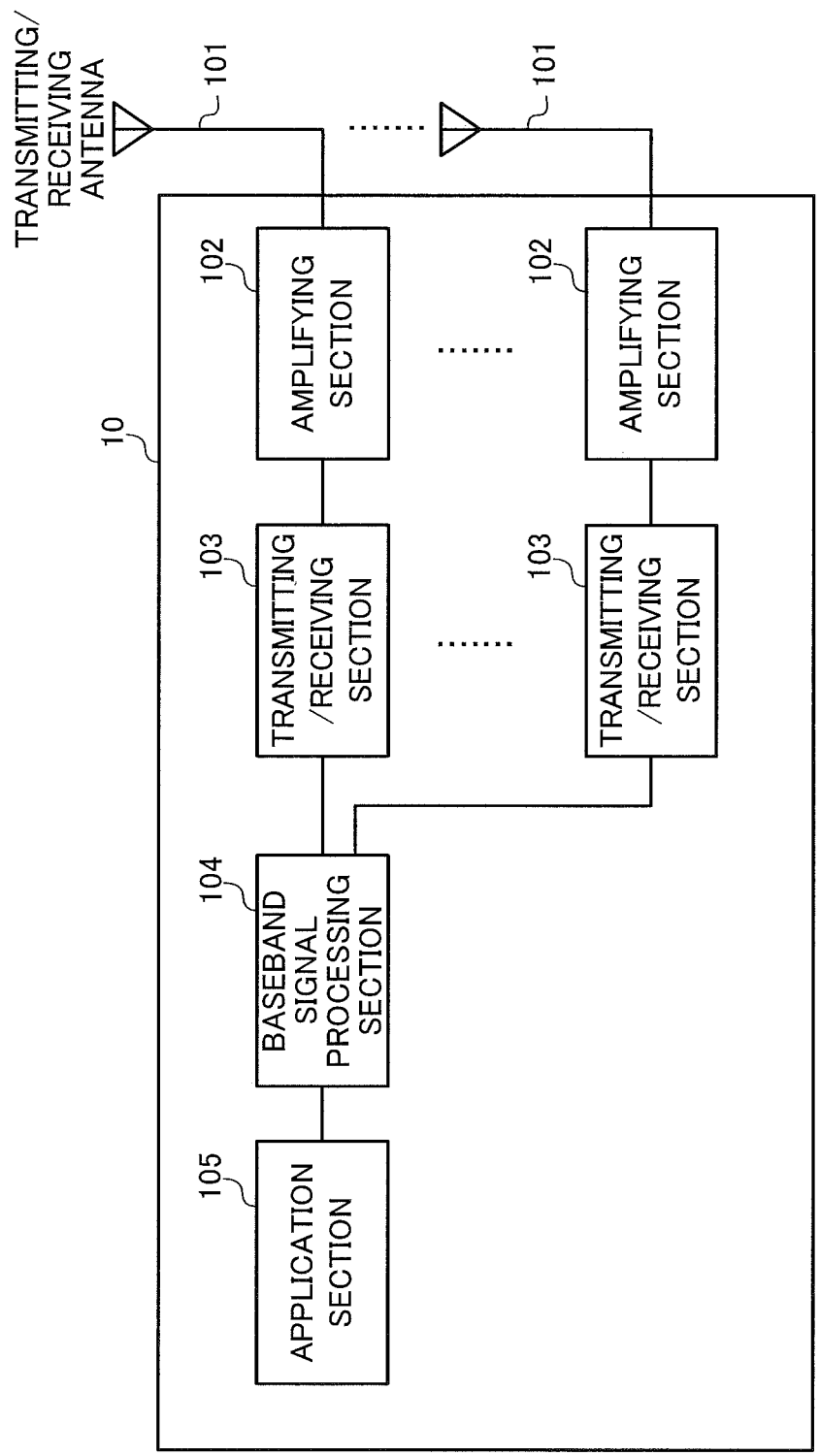
FIG. 11 is a diagram to explain an overall structure of a user terminal.
Figure 12:
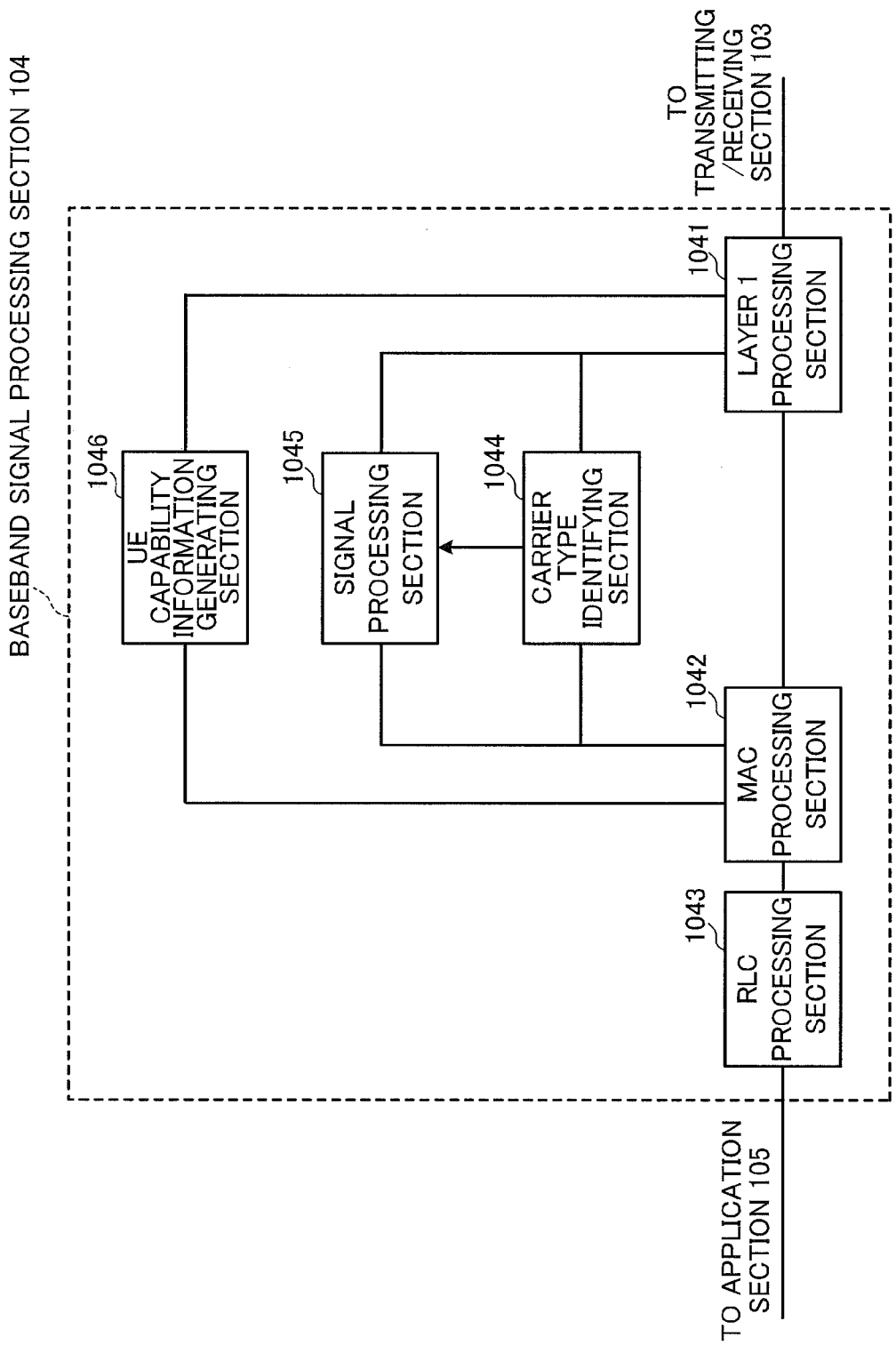
FIG. 12 is a functional block diagram to show a baseband signal processing section provided in a user terminal.

FIG. 12 is a block diagram to show a structure of a baseband signal processing section in a user terminal shown in FIG. 11. The baseband signal processing section 104 is primarily formed with a layer 1 processing section 1041, a MAC processing section 1042, an RLC processing section 1043, a carrier type identifying section 1044, a signal processing section 1045 and a user terminal (UE) capability information generating section 1046.

The layer 1 processing section 1041 mainly performs processes related to the physical layer. The layer 1 processing section 1041, for example, applies processes such as channel decoding, a discrete Fourier transform, frequency demapping, an inverse Fourier transform and data demodulation to a signal received on the downlink. Also, the layer 1 processing section 1041 performs processes for a signal to transmit on the uplink, including channel coding, data modulation, frequency mapping and an inverse fast Fourier transform (IFFT).

The MAC processing section 1042 performs, for the signal received on the downlink, MAC layer retransmission control (hybrid ARQ), an analysis of downlink scheduling information (specifying the PDSCH transport format and specifying the PDSCH resource blocks) and so on. Also, the MAC processing section 1042 performs, for the signal to transmit on the uplink, MAC retransmission control, an analysis of uplink scheduling information (specifying the PUSCH transport format and specifying the PUSCH resource blocks and so on) and so on.

The RLC processing section 1043 performs, for the packets received on the downlink/the packets to transmit on the uplink, packet division, packet coupling, RLC layer retransmission control, and so on.

The carrier type identifying section 1044 identifies the carrier type configured in each subframe based on the carrier type information reported from the radio base station, or the signal structure. For example, when the carrier type information is reported via RRC signaling, the carrier types are determined based on information contained in that RRC signaling. The information to be included in the RRC signaling may include RRC signaling information elements (new carrier type_presense), bitmap information, or information combined with conventional information (CC indicators to correspond to CIF bits) and so on.

Also, the carrier type identifying section 1044 may identify the carrier types based on the signal structures of the synchronization signals, broadcast signals or reference signals. In this case, it is possible to employ a structure in which carrier type information is not signaled from the radio base station to the user terminal.

The signal processing section 1045 performs signal processing (derate matching process and so on) by taking into account the carrier type of each subframe, based on the results identified in and output from the carrier type identifying section 1044.

The UE capability information generating section 1046 generates user terminal capability information, which indicates whether the user terminal is capable of receiving subframes of the new carrier type. The information generated in the UE capability information generating section 1046 can be reported to the radio base station at a predetermined time after RRC connection is established.

As described above, with the communication system according to the present embodiment, subframes of the new carrier type and subframes of the legacy carrier type are changed dynamically between a plurality of component carriers (Pcell and Scell) and configured, so that it is possible to apply carrier aggregation even to user terminals that do not support the new carrier type. By means of this configuration, even in the situation where there are many conventional user terminals in the system, it is possible to adequately configure the new carrier type, and furthermore make effective use frequency resources.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-269276, filed on Dec. 10, 2012, including the specification, drawings and abstract, is incorporated herein by reference in its entirety.

The invention claimed is:

1. A radio base station that communicates with a user terminal by using a plurality of component carriers, comprising:
    a configuration section that configures a subframe of a first carrier type, which a plurality of user terminals of varying capabilities each can receive, and a subframe of a second carrier type, which part of the plurality of user terminals can receive, in component carriers; and
    a transmission section that:
        transmits downlink signals to the user terminal by using the first carrier type and the second carrier type, and
        reports information related to the carrier type of each subframe to the user terminal using one selected from a group consisting of a broadcast signal, a RRC signaling, and a downlink control information,
    wherein the RRC signaling is performed using information combining cell indices and carrier types,
    wherein the configuration section configures the subframe of the first carrier type and the subframe of the second carrier type, on a dynamically changing basis, in at least one of the plurality of component carriers.

2. The radio base station according to claim 1, wherein the transmission section multiplexes a synchronization signal, a broadcast signal or a reference signal in different positions between the subframe of the first carrier type and the subframe of the second carrier type.

3. The radio base station according to claim 1, wherein, when the information related to the carrier type is reported by the RRC signaling, the transmission section defines whether or not the second carrier type is configured, in an information element of the RRC signaling.

4. The radio base station according to claim 1, wherein, when the information related to the carrier type is reported by the RRC signaling, the transmission section uses bitmap information to represent carrier types of a plurality of subframes.

5. The radio base station according to claim 1, further comprising a receiving section that receives information related to capability for receiving the subframe of the second carrier type from each user terminal.

6. A user terminal that communicates with a radio base station by using a plurality of component carriers, comprising:
    a receiving section that receives downlink signals by using component carriers, in which a subframe of a first carrier type, which a plurality of user terminals of varying capabilities each can receive, and a subframe of a second carrier type, which part of the plurality of user terminal can receive, are configured;
    an identifying section that identifies a carrier type of each subframe by using information related to the carrier type of each subframe contained in the downlink signals; and
    a transmission section that:
        transmits information related to capability for receiving the subframe of the second carrier type to the radio base station, and
    wherein the receiving section receives the information related to the carrier type of each subframe that is transmitted using one selected from a group consisting of a broadcast signal, a RRC signaling, and a downlink control information,
    wherein the RRC signaling is performed using information combining cell indices and carrier types.

7. A radio communication method for a user terminal and a radio base station that communicate by using a plurality of component carriers, the radio communication method comprising the steps in which:
    the radio base station:
        configures a subframe of a first carrier type, which a plurality of user terminals of varying capabilities each can receive, and a subframe of a second carrier type, which part of the plurality of user terminals can receive, in component carriers, on a dynamically changing basis;
        transmits downlink signals to the user terminal by using the first carrier type and the second carrier type; and
        reports information related to the carrier type of each subframe to the user terminal using one selected from a group consisting of a broadcast signal, a RRC signaling, and a downlink control information,
        wherein the RRC signaling is performed using information combining cell indices and carrier types;
    the user terminal:

receives the downlink signals and the information related to the carrier type of each subframe; and identifies a carrier type of each subframe by using the information related to the carrier type of each subframe.

* * * * *